US011438624B2

(12) United States Patent
Esenlik et al.

(10) Patent No.: US 11,438,624 B2
(45) Date of Patent: Sep. 6, 2022

(54) APPARATUS AND METHOD FOR MOTION VECTOR REFINEMENT FOR MULTI-REFERENCE PREDICTION

(71) Applicant: HUAWEI TECHNOLOGIES CO., LTD., Guangdong (CN)

(72) Inventors: Semih Esenlik, Munich (DE); Anand Meher Kotra, Munich (DE); Zhijie Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/728,747

(22) Filed: Dec. 27, 2019

(65) Prior Publication Data
US 2020/0137414 A1 Apr. 30, 2020

Related U.S. Application Data

(63) Continuation of application No. PCT/EP2018/058203, filed on Mar. 29, 2018.

(30) Foreign Application Priority Data

Jun. 30, 2017 (WO) ................. PCT/EP2017/066342

(51) Int. Cl.
*H04N 19/176* (2014.01)
*H04N 19/513* (2014.01)
(Continued)

(52) U.S. Cl.
CPC ......... *H04N 19/523* (2014.11); *H04N 19/105* (2014.11); *H04N 19/139* (2014.11);
(Continued)

(58) Field of Classification Search
CPC ...... H04N 19/56; H04N 19/53; H04N 19/533; H04N 19/52; H04N 19/57; H04N 19/573;
(Continued)

(56) References Cited

U.S. PATENT DOCUMENTS 10,200,711 B2 * 2/2019 Li ..................... H04N 19/44
2016/0286229 A1 * 9/2016 Li ..................... H04N 19/176
(Continued)

FOREIGN PATENT DOCUMENTS

CN 102918839 A 2/2013
CN 107534766 A 1/2018
(Continued)

OTHER PUBLICATIONS

Y-J Chiu (Intel) et al, "Description of video coding technology proposal: self derivation of motion estimation and adaptive (Wiener) loop filtering", (Jointcollaborative Team on Video Coding of ISO/IEC JTC1/SC29/WG11 and ITU-TSG.16 ); URL: http://wftp3.itu.int/av-arch/jctvc-site/,,No. JCTVC-A106, Apr. 18, 2010, XP030007537, total 28 pages.
(Continued)

*Primary Examiner* — Alison Slater
(74) *Attorney, Agent, or Firm* — Leydig, Voit & Mayer, Ltd.

(57) ABSTRACT

The present invention relates to the performance of motion vector refinement in a search space for multi-reference inter-prediction. Two or more reference pictures are selected, one of those used for motion vector refinement. Based on an initial estimate of a motion vector to the reference picture for motion vector refinement, a search space in this reference image is constructed. Using template matching, the first motion vector is refined. The second motion vector to another reference picture is calculated using its initial estimate, the initial estimate of the first motion vector and the refined first motion vector.

23 Claims, 8 Drawing Sheets

(51) Int. Cl.

| | | |
|---|---|---|
| *H04N 19/70* | (2014.01) | |
| *H04N 19/52* | (2014.01) | |
| *H04N 19/51* | (2014.01) | |
| *H04N 19/523* | (2014.01) | |
| *H04N 19/105* | (2014.01) | |
| *H04N 19/139* | (2014.01) | |
| *H04N 19/533* | (2014.01) | |
| *H04N 19/56* | (2014.01) | |
| *H04N 19/573* | (2014.01) | |
| *H04N 19/109* | (2014.01) | |
| *H04N 19/577* | (2014.01) | |

(52) U.S. Cl.
CPC ......... *H04N 19/513* (2014.11); *H04N 19/533* (2014.11); *H04N 19/56* (2014.11); *H04N 19/573* (2014.11); *H04N 19/109* (2014.11); *H04N 19/577* (2014.11)

(58) Field of Classification Search
CPC .. H04N 19/139; H04N 19/567; H04N 19/196; H04N 19/54; H04N 19/503; H04N 5/145; H04N 19/43
See application file for complete search history.

(56) References Cited

U.S. PATENT DOCUMENTS

| | | | | |
|---|---|---|---|---|
| 2016/0286232 | A1* | 9/2016 | Li | H04N 19/119 |
| 2017/0289566 | A1* | 10/2017 | He | H04N 19/52 |
| 2018/0249154 | A1* | 8/2018 | Chuang | H04N 19/176 |
| 2019/0007699 | A1* | 1/2019 | Liu | H04N 19/139 |
| 2021/0152842 | A1* | 5/2021 | Hashimoto | H04N 19/176 |

FOREIGN PATENT DOCUMENTS

| | | | |
|---|---|---|---|
| JP | 2011147130 | A | 7/2011 |
| JP | 2013016934 | A | 1/2013 |
| JP | 2018512810 | A | 5/2018 |
| KR | 20170131448 | A | 11/2017 |
| WO | 2016160605 | A1 | 10/2016 |
| WO | 2016160608 | A1 | 10/2016 |
| WO | 2017036414 | A1 | 3/2017 |
| WO | 2019001786 | A1 | 1/2019 |

OTHER PUBLICATIONS

Y-J Chiu et al, "CE1 Subtest1: A joint proposal of candidate-based decoder-side motion vector derivation", (Motion Picture Expert Group or ISO/IEC JTC1/SC29/WG11),,No. m19473, JCTVC-A106, Jan. 26, 2011, XP030048040, total 10 pages.

Chiu Yi-Jen et al, "Decoder-side Motion Estimation and Wiener filter for HEVC", 2013 Visual Communications and Image Processing (VCIP), IEEE, Nov. 17, 2013 (Nov. 17, 2013), p. 1-6, XP032543658.

Y-Jen Chiu et al, "TE1: Fast techniques to improve self derivation of motion estimation",(JOINT Collaborativeteam on Video Coding of ISO/IEC JTC1/SC29/WG11 and ITU-T SG.16 ); No. JCTVC-B047, Jul. 28, 2010 (Jul. 28, 2010), XP030007627, total 10 pages.

Liu Z et al, "Content-aware fast motion estimation for H.264/AVC", IEICE Transactions on Fundamentals of Electronics,Communications and Computer Sciences, Engineering Sciences Society, Tokyo, JP,vol. E91A, No. 8, Aug. 1, 2008 (Aug. 1, 2008), p. 1944-1952, XP001515797.

Xu Chen et al. Decoder-Side Motion Vector Refinement Based on Bilateral Template Matching, JVET-D0029, 4th Meeting: Chengdu, CN, Oct. 15-21, 2016. total 4 pages.

Jianle Chen et al. Algorithm Description of Joint Exploration Test Model 1, Joint Video Exploration Team (JVET) of ITU-T SG 16 WP 3 and ISO/IEC JTC 1/SC 29/WG 11, JVET-A1001, 1nd Meeting: Geneva, CH, Oct. 19-21, 2015. total 27 pages.

Jianle Chen et al. Algorithm Description of Joint Exploration Test Model 7 (JEM 7), Joint Video Exploration Team (JVET) of ITU-T SG 16 WP 3 and ISO/IEC JTC 1/SC 29/WG 11, JVET-G1001-v1, 7th Meeting: Torino, IT, Jul. 13-21, 2017, total 48 pages.

Y-J Chiu et al, "CE1 Subtest1: A joint proposal of candidate-based decoder-side motion vector derivation", (Motion Picture Expert Group or ISO/IEC JTC1/SC29/WG11), No. m19473, JCTVC-D448r1, Jan. 26, 2011, XP030048040, total 10 pages.

Benjamin Brass et al. "Chapter 5 Inter-Picture Prediction in HEVC", High Efficiency Video Coding (HEVC): Algorithms and Architectures, Springer, 2014, pp. 113-140.

CN/201880044272.8, Office Action/Search Report, dated Jun. 28, 2021.

JP2019-571974, Notice of Reasons for Rejection, dated Mar. 8, 2021.

CL/201903880, Office Action, dated Oct. 7, 2021.

U.S. Appl. No. 17/506,403, filed Oct. 20, 2021, Pending.

* cited by examiner

APPARATUS AND METHOD FOR MOTION VECTOR REFINEMENT FOR MULTI-REFERENCE PREDICTION

CROSS-REFERENCE TO RELATED APPLICATIONS

This application is a continuation of International Application No. PCT/EP2018/058203, filed on Mar. 29, 2018, which claims priority to International Patent Application No. PCT/EP2017/066342 filed on Jun. 30, 2017. The disclosures of the aforementioned applications are hereby incorporated by reference in their entireties.

BACKGROUND

Current hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information which enables the decoder to decode the encoded video. For instance, the signaling may include settings concerning the encoder settings such as size of the input picture, frame rate, quantization step indication, prediction applied to the blocks of the pictures, or the like.

Temporal prediction exploits temporal correlation between pictures, also referred to as frames, of a video. The temporal prediction is also called inter-prediction, as it is a prediction using the dependencies between (inter) different video frames. Accordingly, a block being encoded, also referred to as a current block, is predicted from (one or) more previously encoded picture(s) referred to as a reference picture. The reference picture is not necessarily a picture preceding the current picture in which the current block is located in the displaying order of the video sequence. The encoder may encode the pictures in a coding order different from the displaying order. As a prediction of the current block, a co-located block in a reference picture may be determined. The co-located block is a block which is located in the reference picture on the same position as the current block in the current picture. Such prediction is accurate for motionless picture regions, i.e. picture regions without movement from one picture to another.

In order to obtain a predictor which takes into account the movement, i.e. a motion compensated predictor, motion estimation is typically employed when determining the prediction of the current block. Accordingly, the current block is predicted by a block in the reference picture, which is located in a distance given by a motion vector from the position of the co-located block. In order to enable a decoder to determine the same prediction of the current block, the motion vector may be signaled in the bitstream. In order to further reduce the signaling overhead caused by signaling the motion vector for each of the blocks, the motion vector itself may be estimated. The motion vector estimation may be performed based on the motion vectors of the neighboring blocks in spatial and/or temporal domain.

The prediction of the current block may be computed using one reference picture or by weighting predictions obtained from two or more reference pictures. The reference picture may be an adjacent picture, i.e. a picture immediately preceding and/or the picture immediately following the current picture in the display order since adjacent pictures are most likely to be similar to the current picture. However, in general, the reference picture may be also any other picture preceding or following the current picture in the displaying order and preceding the current picture in the bitstream (decoding order). This may provide advantages for instance in case of occlusions and/or non-linear movement in the video content. The reference picture may thus be also signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction may result in a more accurate prediction of the current block than the uni-prediction, i.e. prediction only using a single reference picture. The more accurate prediction leads to smaller differences between the pixels of the current block and the prediction (referred to also as "residuals"), which may be encoded more efficiently, i.e. compressed to a shorter bitstream. In general, more than two reference pictures may be used to find respective more than two reference blocks to predict the current block, i.e. a multi-reference inter prediction can be applied. The term multi-reference prediction thus includes bi-prediction as well as predictions using more than two reference pictures.

In order to provide more accurate motion estimation, the resolution of the reference picture may be enhanced by interpolating samples between pixels. Fractional pixel interpolation can be performed by weighted averaging of the closest pixels. In case of half-pixel resolution, for instance a bilinear interpolation is typically used. Other fractional pixels are calculated as an average of the closest pixels weighted by the inverse of the distance between the respective closest pixels to the pixel being predicted.

The motion vector estimation is a computationally complex task in which a similarity is calculated between the current block and the corresponding prediction blocks pointed to by candidate motion vectors in the reference picture. In order to reduce the complexity, the number of candidate motion vectors is usually reduced by limiting the candidate motion vectors to a certain search space. The search space may be, for instance, defined by a number and/or positions of pixels surrounding the position in the reference picture corresponding to the position of the current block in the current image. On the other hand, the candidate motion vectors may be defined by a list of candidate motion vectors formed by motion vectors of neighboring blocks.

Motion vectors are usually at least partially determined at the encoder side and signaled to the decoder within the coded bitstream. However, the motion vectors may also be derived at the decoder. In such case, the current block is not available at the decoder and cannot be used for calculating the similarity to the blocks to which the candidate motion vectors point in the reference picture. Therefore, instead of the current block, a template is used which is constructed out of pixels of already decoded blocks. For instance, already decoded pixels adjacent to the current block (in the current picture or in the reference picture) may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. Such a selected motion vector may be further refined for instance by a search within a search space. The search in the search space is based on calculating cost function for each candidate motion vector, i.e. for each candidate position of block to which the candidate motion vector points.

Document JVET-D0029: Decoder-Side Motion Vector Refinement Based on Bilateral Template Matching, X. Chen, J. An, J. Zheng (The document can be found at: http://phenix.it-sudparis.eu/jvet/site) shows motion vector refinement in which a first motion vector in integer pixel resolution is found and further refined by a search with a half-pixel resolution in a search space around the first motion vector.

SUMMARY

When multi-reference prediction is applied, motion vectors in a plurality of reference pictures have to be determined. Even if the motion vectors are signaled in the first stage so that the decoder does not need to perform any further search, the motion vector refinement still requires an additional search among the motion vectors of a corresponding search space. This may be a complex task which requires computational resources as well as memory.

The present disclosure provides a technique in which a first motion vector in a first reference picture and a second motion vector in a second reference picture are determined. Complexity can thus be reduced. At first, the first motion vector and the second motion vector are roughly estimated. Then, the first motion vector is refined by performing a search in a search space given by the rough estimate of the first motion vector. The second motion vector is determined by calculation based on its rough estimate as well as based on the refined first motion vector. The first and second motion vectors may be applied in inter-prediction of the current block in a current picture, used at the decoder on the encoding and/or decoding side.

According to a first aspect, the invention relates to an apparatus for determining a first motion vector in a first reference picture and a second motion vector in a second reference picture, the first and second motion vectors to be applied in inter-prediction of a picture block in a current picture, the apparatus comprises a motion vector refinement unit and a motion vector calculation unit. The motion vector refinement unit is configured to obtain an estimate of the first motion vector. A search space is specified based on the estimate of the first motion vector. Within the search space, the motion vector refinement unit performs search to determine the first motion vector. The motion vector calculation unit obtains an estimate of the second motion vector. Based on the estimate of the second motion vector and the first motion vector, the motion vector calculation unit calculates the second motion vector.

Thus, the motion vector determination can be performed with less complexity while still maintaining accuracy given by the refinement of the first motion vector and based thereon estimating the refinement amount for the second motion vector.

In a possible implementation form of the apparatus according to the first aspect as such, the second motion vector is calculated by adding to the estimate of the second motion vector a function of a difference between the first motion vector and the estimate of the first motion vector. This function may include scaling and/or clipping. When the scaling parameter is determined, its value may depend on the ratio between the respective distances of the first reference picture and the second reference picture to the current picture.

The calculation of the second motion vector as a function of the refinement performed on the first motion vector is a low-complexity estimation. Moreover, by further modifying it (e.g., by scaling depending on the distance between the respective reference pictures), the estimation may become even more accurate.

The apparatus, advantageously further contains a reference picture selection unit for obtaining reference pictures and selecting which of them is the first reference picture and the second reference picture. Following this selection it determines whether the first reference picture or the second reference picture is to be used for motion vector refinement. A list of reference pictures associates an index to be included into bitstream with the position of a reference picture with respect to the current picture. The reference picture selection unit is configured to select the first reference picture and the second reference picture based on whether or not it is referred to in the bitstream by an index in the predefined list of reference pictures.

In other words, the reference picture selection unit is configured to select either the first picture or the second picture based on whether the respective first or second picture is referred to in a bit stream also including the coded picture block of the video by an index relating to a predefined list of reference pictures among at least two lists of reference pictures, wherein a list of reference pictures associates an index with the position of a reference picture with respect to the current picture.

If the two reference pictures are referred to in the bitstream by an index in the same predefined list of reference pictures, the reference picture selection unit may select the reference picture to be used for motion vector refinement as the picture with the highest position in said list of reference pictures.

Alternatively, the reference picture to be used for motion vector refinement can be selected as the picture, which has the lowest temporal layer among the two pictures.

The reference picture to be used for motion vector refinement can be selected as the picture, which has the lowest base quantization value, or as the picture, which has the lowest distance to the current picture as well.

As a further approach, the reference picture to be used for motion vector refinement can be selected such that the magnitude of the estimate of the motion vector pointing at the reference picture to be used for motion vector refinement is smaller than the magnitude of the estimate of the other motion vector.

The apparatus may further comprise a motion vector determination unit for determining the estimate of the first motion vector and the estimate of the second motion vector. This determination is performed by selecting them from a set of motion vector candidates based on similarity of a template with a portion of the respective picture referred to by the motion vector candidate.

A video encoder for encoding a plurality of pictures into a bitstream comprises an inter-prediction unit, a bitstream former and a reconstruction unit. The inter-prediction unit includes the apparatus for determining the first motion vector and the second motion vector as well as a prediction unit. The prediction unit determines the prediction block according to a portion of the first reference picture referred to by the first motion vector and a portion of the second reference picture referred to by the second motion vector. The bitstream former includes into the bitstream the estimate of the first motion vector and the estimate of the second motion vector. The reconstruction unit reconstructs the current block according to the prediction block and stores the reconstructed block into a memory.

A video decoder for decoding a plurality of pictures from a bitstream comprises an inter-prediction unit, a bitstream parser and a reconstruction unit. The inter-prediction unit includes the apparatus for determining the first motion vector and the second motion vector as well as a prediction unit. The prediction unit determines the prediction block according to a portion of the first reference picture referred to by the first motion vector and a portion of the second reference picture referred to by the second motion vector. The bitstream parser obtains from the bitstream an estimate of the first motion vector and an estimate of the second motion vector. The reconstruction unit reconstructs the current block, according to the prediction block.

The method comprises motion vector refinement and motion vector calculation. An estimate of the first motion vector is obtained. A search space is specified based on the estimate of the first motion vector. Within the search space, a search to determine the first motion vector is performed. An estimate of the second motion vector is obtained. Based on the estimate of the second motion vector and the first motion vector, the second motion vector is calculated. The second motion vector is calculated by adding to the estimate of the second motion vector a function of a difference between the first motion vector and the estimate of the first motion vector. This function includes scaling and/or clipping. The value of the scaling parameter depends on the ratio between the respective distances of the first reference picture and the second reference picture to the current picture.

The method further comprises a reference picture selection for obtaining reference pictures and selecting which of them is the first reference picture and the second reference picture. Following this selection it determines whether the first reference picture or the second reference picture is to be used for motion vector refinement. A list of reference pictures associates an index to be included into bitstream with the position of a reference picture with respect to the current picture. The reference picture selection is performed to select the first reference picture and the second reference picture based on whether or not it is referred to in the bitstream by an index in the predefined list of reference pictures. If the two reference pictures are referred to in the bitstream by an index in the same predefined list of reference pictures, the reference picture to be used for motion vector refinement is selected as the picture with the highest position in said list of reference pictures. Alternatively, the reference picture to be used for motion vector refinement can be selected as the picture, which has the lowest temporal layer among the two pictures. The reference picture to be used for motion vector refinement can be selected as the picture, which has the lowest base quantization value, or as the picture, which has the lowest distance to the current picture as well. As a further approach, the reference picture to be used for motion vector refinement can be selected such that the magnitude of the estimate of the motion vector pointing to the reference picture to be used for motion vector refinement is smaller than the magnitude of the estimate of the other motion vector.

The method may further determine the estimate of the first motion vector and the estimate of the second motion vector. This determination is performed by selecting them from a set of motion vector candidates based on similarity of a template with a portion of the respective picture referred to by the motion vector candidate.

A video encoding method for encoding a plurality of pictures into a bitstream comprises performing inter-prediction, bitstream forming and block reconstruction. The inter-prediction includes determining the first motion vector and the second motion vector as well as a block prediction. The prediction includes determining the prediction block according to a portion of the first reference picture referred to by the first motion vector and a portion of the second reference picture referred to by the second motion vector. The bitstream forming includes into the bitstream the estimate of the first motion vector and the estimate of the second motion vector. The reconstruction includes reconstructing the current block according to the prediction block and storing the reconstructed block into a memory.

A video decoding method for decoding a plurality of pictures from a bitstream comprises performing inter-prediction, bitstream parsing and block reconstruction. The inter-prediction includes determining the first motion vector and the second motion vector as well as a block prediction. The prediction determines the prediction block according to a portion of the first reference picture referred to by the first motion vector and a portion of the second reference picture referred to by the second motion vector.

The bitstream parsing obtains from the bitstream an estimate of the first motion vector and an estimate of the second motion vector. The reconstruction includes reconstructing the current block, according to the prediction block.

The present invention may reduce the number of search candidates in the process of motion vector refinement without any impact on coding performance while providing similar picture quality. This is achieved by performing a search for the motion vector refinement only on one reference picture for a current block, while another motion vector for another reference picture of the same current block is calculated based on the refined motion vector.

BRIEF DESCRIPTION OF THE DRAWINGS

In the following exemplary embodiments are described in more detail with reference to the attached figures and drawings, in which.

DESCRIPTION OF THE EMBODIMENTS

The present disclosure relates to determination of motion vectors for a multi-reference prediction. It may be employed in motion estimation performed during encoding and decoding of video. In the following, exemplary encoder and decoder which may implement the motion estimation employing the search space construction of the present disclosure are described in the following.

Figure 1:
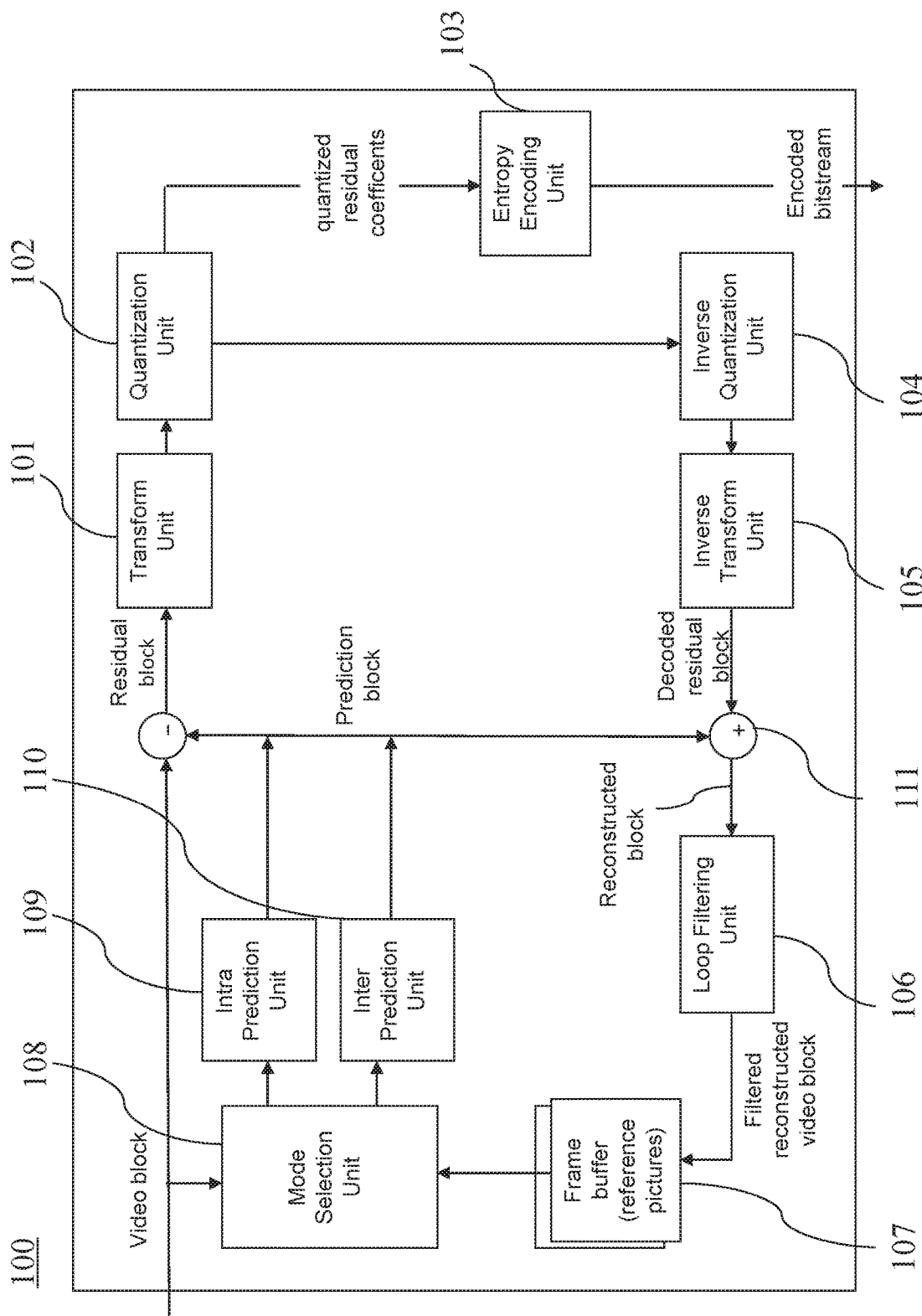
FIG. 1 is a block diagram showing an exemplary structure of an encoder in which the motion vector derivation and refinement may be employed.

FIG. 1 shows an encoder 100 which comprises an input for receiving input blocks of frames or pictures of a video stream and an output for generating an encoded video bitstream. The term "frame" in this disclosure is used as a synonym for picture. However, it is noted that the present disclosure is also applicable to fields in case interlacing is applied. In general, a picture includes m times n pixels. This corresponds to image samples and may comprise one or more color components. For the sake of simplicity, the following description refers to pixels meaning samples of luminance. However, it is noted that the motion vector search of the invention can be applied to any color component including chrominance or components of a search space such as RGB or the like. On the other hand, it may be beneficial to only perform motion vector estimation for one component and to apply the determined motion vector to more (or all) components.

The input blocks to be coded do not necessarily have the same size. One picture may include blocks of different sizes and the block raster of different pictures may also differ.

In an explicative realization, the encoder 100 is configured to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit 109. An intra frame is coded using only the information within the same frame, so that it can be independently decoded and it can provide an entry point in the bitstream for random access. Blocks of other frames of the video stream may be inter coded by means of an inter prediction unit 110: information from previously coded frames (reference frames) is used to reduce the temporal redundancy, so that each block of an inter-coded frame is predicted from a block in a reference frame. A mode selection unit 108 is configured to select whether a block of a frame is to be processed by the intra prediction unit 109 or the inter prediction unit 110. This block also controls the parameters of intra of inter prediction. In order to enable refreshing of the image information, intra-coded block may be provided within inter-coded frames. Moreover, intra-frames which contain only intra-coded blocks may be regularly inserted into the video sequence in order to provide entry points for decoding, i.e. points where the decoder can start decoding without having information from the previously coded frames.

The intra prediction unit 109 is a block prediction unit. For performing spatial or temporal prediction, the coded blocks may be further processed by an inverse quantization unit 104, and an inverse transform unit 105. After reconstruction of the block a loop filtering unit 106 is applied to further improve the quality of the decoded image. The filtered blocks then form the reference frames that are then stored in a frame buffer 107. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding to the decoded residual block the prediction block.

The inter prediction unit 110 receives as an input a block of a current frame or picture to be inter coded and one or several reference frames or pictures from the frame buffer 107. Motion estimation and motion compensation are applied by the inter prediction unit 110. The motion estimation is used to obtain a motion vector and a reference frame based on certain cost function. The motion compensation then describes a current block of the current frame in terms of the translation of a reference block of the reference frame to the current frame, i.e. by a motion vector. The inter prediction unit 110 outputs the prediction block for the current block, wherein said prediction block minimizes the cost function. For instance, the cost function may be a difference between the current block to be coded and its prediction block, i.e. the cost function minimizes the residual block. The minimization of the residual block is based e.g. on calculating a sum of absolute differences (SAD) between all pixels (samples) of the current block and the candidate block in the candidate reference picture. However, in general, any other similarity metric may be employed, such as mean square error (MSE) or structural similarity metric (SSIM).

However, cost-function may also be the number of bits necessary to code such inter-block and/or distortion resulting from such coding. Thus, the rate-distortion optimization procedure may be used to decide on the motion vector selection and/or in general on the encoding parameters such as whether to use inter or intra prediction for a block and with which settings.

The intra prediction unit 109 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 109 outputs a prediction block for the current block, wherein said prediction block advantageously minimizes the difference between the current block to be coded and its prediction block, i.e., it minimizes the residual block. The minimization of the residual block can be based e.g. on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 101. The transform coefficients are quantized by the quantization unit 102 and entropy coded by the entropy encoding unit 103. The thus generated encoded video bitstream comprises intra coded blocks and inter coded blocks and the corresponding signaling (such as the mode indication, indication of the motion vector, and/or intra-prediction direction). The transform unit 101 may apply a linear transformation such as a Fourier or Discrete Cosine Transformation (DFT/FFT or DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. Quantization unit 102 performs the actual lossy compression by reducing the resolution of the coefficient values. The entropy coding unit 103 then assigns to coefficient values binary codewords to produce a bitstream. The entropy coding unit 103 also codes the signaling information (not shown in FIG. 1).

Figure 2:
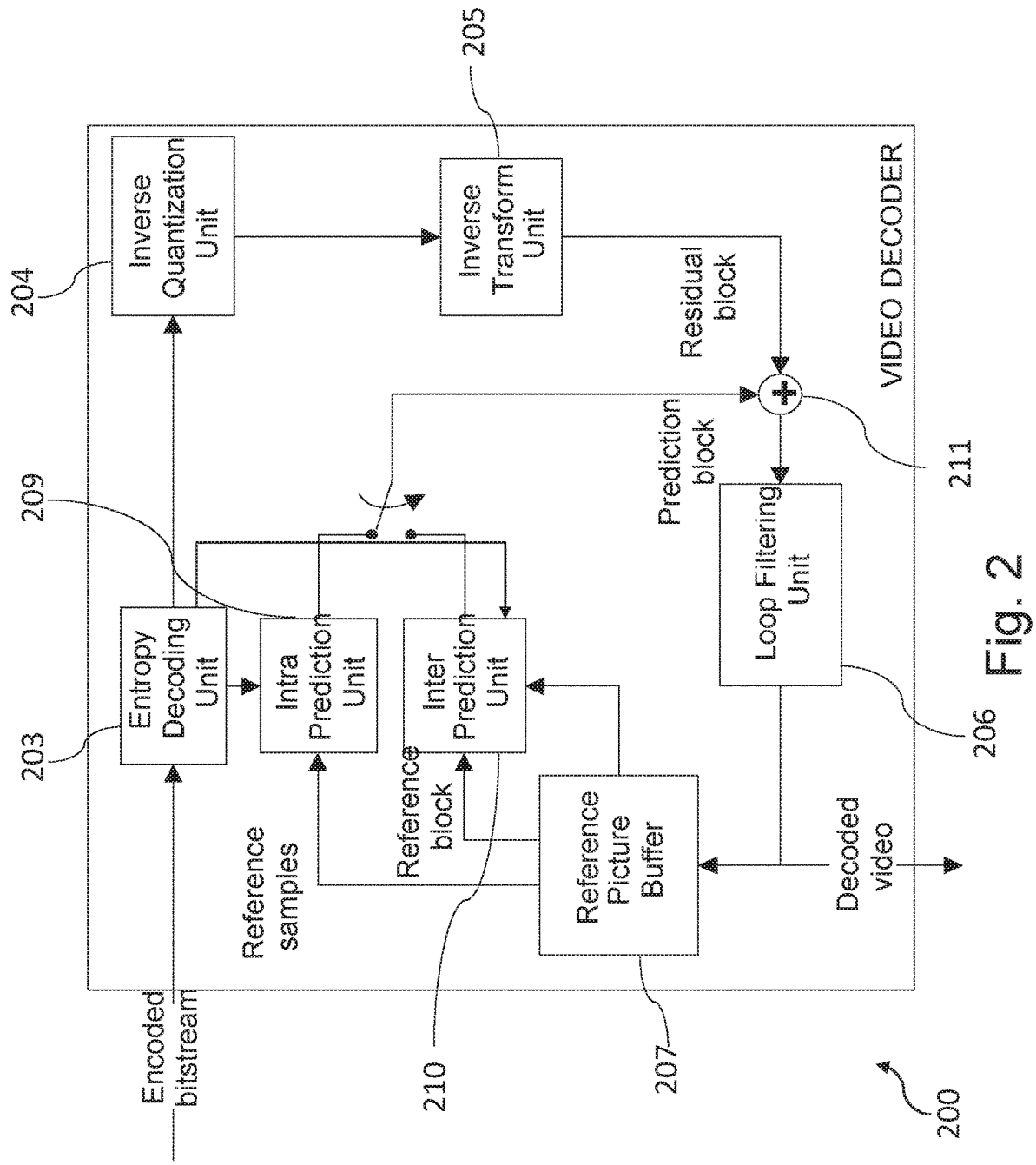
FIG. 2 is a block diagram showing an exemplary structure of a decoder in which the motion vector derivation and refinement may be employed.

FIG. 2 shows a video decoder 200. The video decoder 200 comprises particularly a reference picture buffer 207 and an intra prediction unit 209, which is a block prediction unit. The reference picture buffer 207 is configured to store at least one reference frame reconstructed from the encoded video bitstream, said reference frame being different from a current frame (currently decoded frame) of the encoded video bitstream. The intra prediction unit 209 is configured to generate a prediction block, which is an estimate of the block to be decoded. The intra prediction unit 209 is configured to generate this prediction based on reference samples that are obtained from the reference picture buffer 207.

The decoder 200 is configured to decode the encoded video bitstream generated by the video encoder 100, and preferably both the decoder 200 and the encoder 100 generate identical predictions for the respective block to be encoded/decoded. The features of the reference picture buffer 207 and the intra prediction unit 209 are similar to the features of the reference picture buffer 107 and the intra prediction unit 109 of FIG. 1.

The video decoder 200 comprises further units that are also present in the video encoder 100 like e.g. an inverse quantization unit 204, an inverse transform unit 205, and a loop filtering unit 206, which respectively correspond to the inverse quantization unit 104, the inverse transform unit 105, and the loop filtering unit 106 of the video encoder 100.

An entropy decoding unit 203 is configured to decode the received encoded video bitstream and to correspondingly obtain quantized residual transform coefficients and signaling information. The quantized residual transform coefficients are fed to the inverse quantization unit 204 and an inverse transform unit 205 to generate a residual block. The residual block is added to a prediction block and the addition is fed to the loop filtering unit 206 to obtain the decoded video. Frames of the decoded video can be stored in the reference picture buffer 207 and serve as a reference frame for inter prediction.

Generally, the intra prediction units 109 and 209 of FIGS. 1 and 2 can use reference samples from an already encoded area to generate prediction signals for blocks that need to be encoded or need to be decoded.

The entropy decoding unit 203 receives as its input the encoded bitstream. In general, the bitstream is at first parsed, i.e. the signaling parameters and the residuals are extracted from the bitstream. Typically, the syntax and semantic of the bitstream is defined by a standard so that the encoders and decoders may work in an interoperable manner. As described in the above Background section, the encoded bitstream does not only include the prediction residuals. In case of motion compensated prediction, a motion vector indication is also coded in the bitstream and parsed therefrom at the decoder. The motion vector indication may be given by means of a reference picture in which the motion vector is provided and by means of the motion vector coordinates. So far, coding the complete motion vectors was considered. However, also only the difference between the current motion vector and the previous motion vector in the bitstream may be encoded. This approach allows exploiting the redundancy between motion vectors of neighboring blocks.

In order to efficiently code the reference picture, H.265 codec (ITU-T, H265, Series H: Audiovisual and multimedia systems: High Efficient Video Coding) provides a list of reference pictures assigning to list indices respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression.

For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The lists L0 and L1 may be defined in the standard and fixed. However, more flexibility in coding/decoding may be achieved by signaling them at the beginning of the video sequence.

Accordingly, the encoder may configure the lists L0 and L1 with particular reference pictures ordered according to the index. The L0 and L1 lists may have the same fixed size. There may be more than two lists in general. The motion vector may be signaled directly by the coordinates in the reference picture. Alternatively, as also specified in H.265, a list of candidate motion vectors may be constructed and an index associated in the list with the particular motion vector can be transmitted.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The MVPs are usually derived from already decoded motion vectors from spatial neighboring blocks or from temporally neighboring blocks in the co-located picture. In H.264/AVC, this is done by doing a component wise median of three spatially neighboring motion vectors. Using this approach, no signaling of the predictor is required. Temporal MVPs from a co-located picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs, is used for motion vector derivation. The variable coding quadtree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

In order to further improve motion vector estimation without further increase in signaling overhead, it may be beneficial to further refine the motion vector derived at the encoder side and provided in the bitstream. The motion vector refinement may be performed at the decoder without assistance from the encoder. The encoder in its decoder loop may employ the same refinement to obtain corresponding reference pictures. The refinement is performed by determining a template, determining a search space and finding in the search space a reference picture portion best matching the template. The best matching portion position determines the best motion vector which is then used to obtain the predictor of the current block, i.e. the current block being reconstructed.

Figure 3:
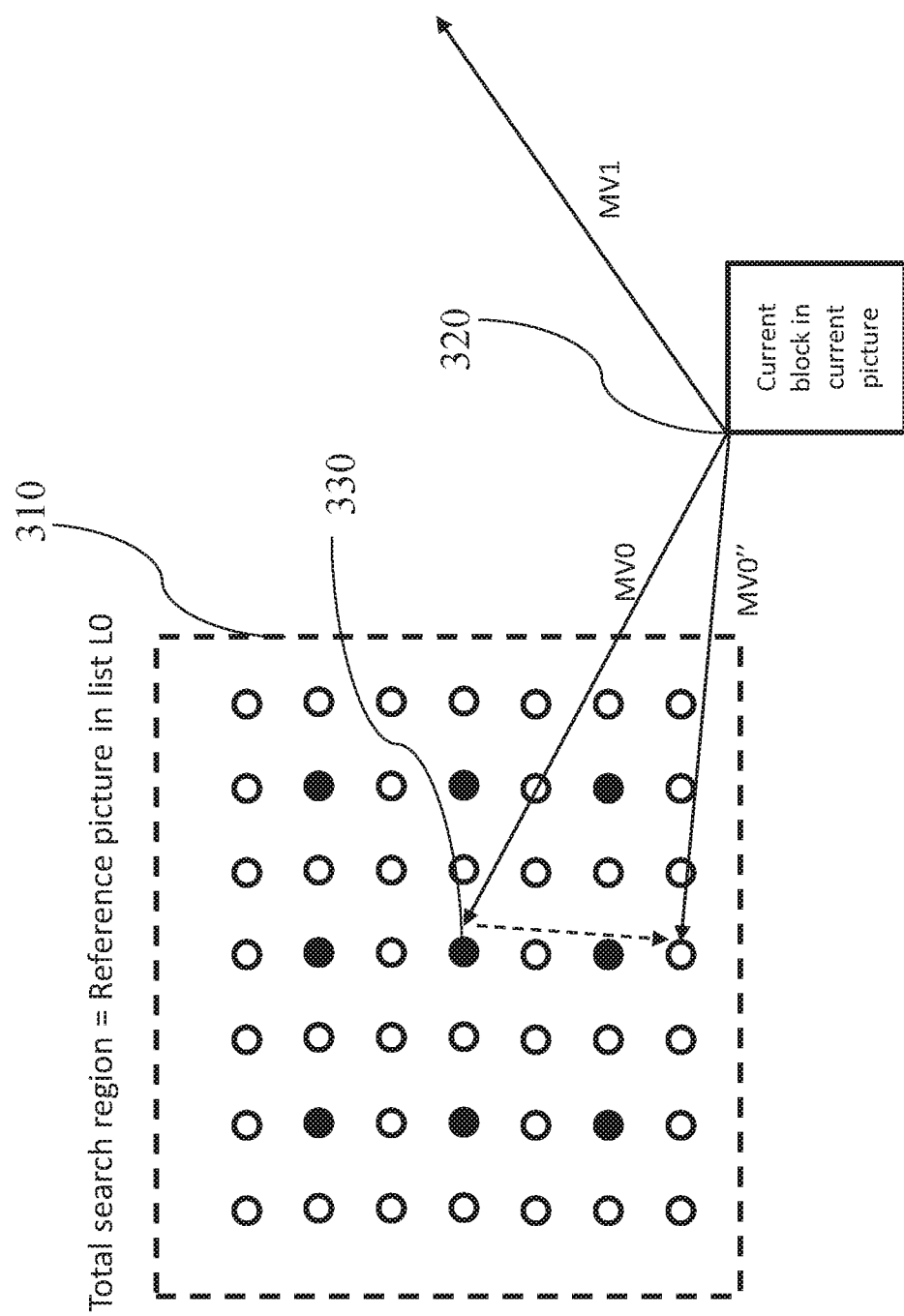
FIG. 3 is a schematic drawing illustrating motion vector refinement of a first motion vector.

FIG. 3 illustrates a search space (search region) 310 which includes integer pixel positions (full dots) and fractional pixel positions (empty dots) of a reference picture. In this example, the fractional pixel positions are half-pixel positions. As described above, the fractional pixel positions may be obtained from the integer (full-pixel) positions by interpolation such as bi-linear interpolation.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression. FIG. 3 further illustrates a current block 320 from the current picture. Since at the decoder, the current block is not available since it is being decoded, for the purpose of motion vector refinement, a template is used, which is an estimate of the current block and which is constructed based on the already processed (i.e. coded at the encoder side and decoded at the decoder side) image portions.

The template may be constructed, for example, based on samples belong to the current picture which have already been decoded, i.e. which are decoded before the current block. Additionally or alternatively, these samples may belong to any of the previously decoded reference pictures. As an example, the samples to be used in construction of the template may belong to the reference picture that is decoded before the current picture and precedes the current picture in display order. Alternatively, the samples may belong to the reference picture that is decoded before the current picture and that follows the current picture in display order. Finally, the template can be constructed based on a combination of samples from two different reference pictures. As is apparent to the person skilled in the art, the template can be obtained using different methods such that the current block can be estimated with the constructed template.

First, an estimate of the first motion vector MV0 and an estimate of the second motion vector MV1 are received as input at the decoder 200 as illustrated in FIG. 3. At the encoder side 100, the motion vector estimates MV0 and MV1 may be obtained by block matching and/or by search in a list of candidates (such as merge list) formed by motion vectors of the blocks neighboring to the current block (in the same picture or in adjacent pictures). The MV0 and MV1 are then advantageously signaled to the decoder side within the bitstream. However, it is noted that in general, also the first determination stage at the encoder could be performed by template matching which would provide the advantage of reducing signaling overhead.

At the decoder side 200, the motion vectors MV0 and MV1 are advantageously obtained based on information in the bitstream. The MV0 and MV1 are either directly signaled, or differentially signaled, and/or an index in the list of motion vector (merge list) is signaled. However, the present disclosure is not limited to signaling motion vectors in the bitstream. Rather, the motion vector may be determined by template matching already in the first stage, correspondingly to the operation of the encoder. The template matching of the first stage (motion vector derivation) may be performed based on a search space different from the search space of the second, refinement stage. In particular, the refinement may be performed on a search space with higher resolution (i.e. lower distance between the search positions).

An indication of the two reference pictures, to which respective MV0 and MV1 point, are provided to the decoder as well. The reference pictures are stored in the reference picture buffer at the encoder and decoder side as a result of previous processing, i.e. respective encoding and decoding. One of these reference pictures is selected for motion vector refinement by search. A reference picture selection unit of the apparatus for the determination of motion vectors is configured to select the first reference picture to which MV0 points and the second reference picture to which MV1 points. Following the selection, the reference picture selection unit determines whether the first reference picture or the second reference picture is used for the performance of motion vector refinement. In FIG. 3, the first reference picture to which motion vector MV0 points is selected for the search. For performing motion vector refinement, the search region 310 in the first reference picture is defined around the candidate position to which motion vector MV0 points. The candidate search space positions within the search region 310 are analyzed to find a block most similar to a template block by performing template matching within the search space and determining a similarity metric such as the sum of absolute differences (SAD). As mentioned above, in one implementation, the template is constructed based on a combination of samples from two different reference pictures with the respective motion vector of MV0 and MV1. The template matching is performed to find a block based on the point in search region 310 which is most similar to the template. Alternatively, in another implementation, the template is constructed to find the similarity between a prediction block P0 generated based on MV0 in L0 and a prediction block P1 generated based on MV1 in L1. To perform the refinement for MV0, the template matching comprises finding a block based on the point in search region 310 which is determined by a similarity metric (such as SAD, for example) between P0 and P1. The positions of the search space 310 denote the positions on which the top left corner of the template 320 is matched. As already mentioned above, the top left corner is a mere convention and any point of the search space such as the central point 330 can in general be used to denote the matching position.

The candidate position with the lowest SAD value is determined as the motion vector MV0". In FIG. 3, the position to which MV0" points is a half-pel position and it differs from the initial estimate MV0 by 1.5 pixel positions in vertical direction, while the horizontal direction remains the same.

Figure 4:
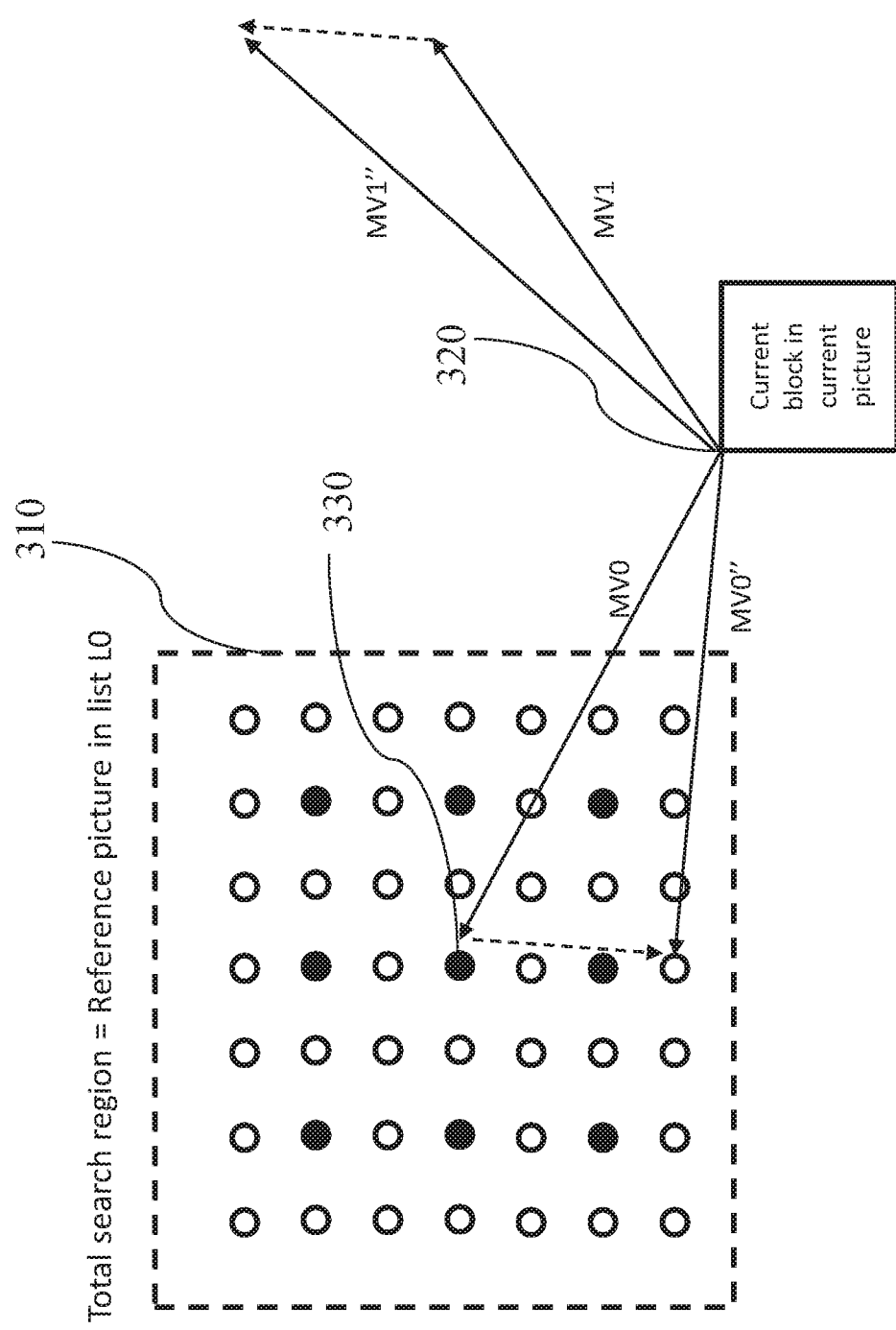
FIG. 4 is a schematic drawing illustrating motion vector refinement of the second motion vector based on the refined first motion vector.

According to the present disclosure, for bi-prediction or multi-reference prediction, at least one motion vector of the current block is refined by calculation based on another refined motion vector of the current block rather than by performing the template matching. FIG. 4 illustrates such refinement. In particular, the motion vector MV1" is calculated based on motion vector estimate MV1 and a function of MV0"-MV0 instead of performing a second template matching. In the example of FIG. 4, the determination and refinement of the first motion vector MV0" is performed as described above with reference to FIG. 3. Moreover, motion vector MV1" is calculated by subtracting from the second motion vector estimate MV1" the difference between the MV0" and MV0.

This approach exploits the fact that most of the motion in a video sequence falls in the category of "translational motion". In translational motion, an object is moving at a constant speed (at least between the frames that are close to each other in sampling time). This means that an object is displaced in consecutive frames by the same pixel distance in x- and -y directions (if the temporal sampling period is not varying over time). The invention utilizes the principle of translational motion to some extent.

Figure 5:
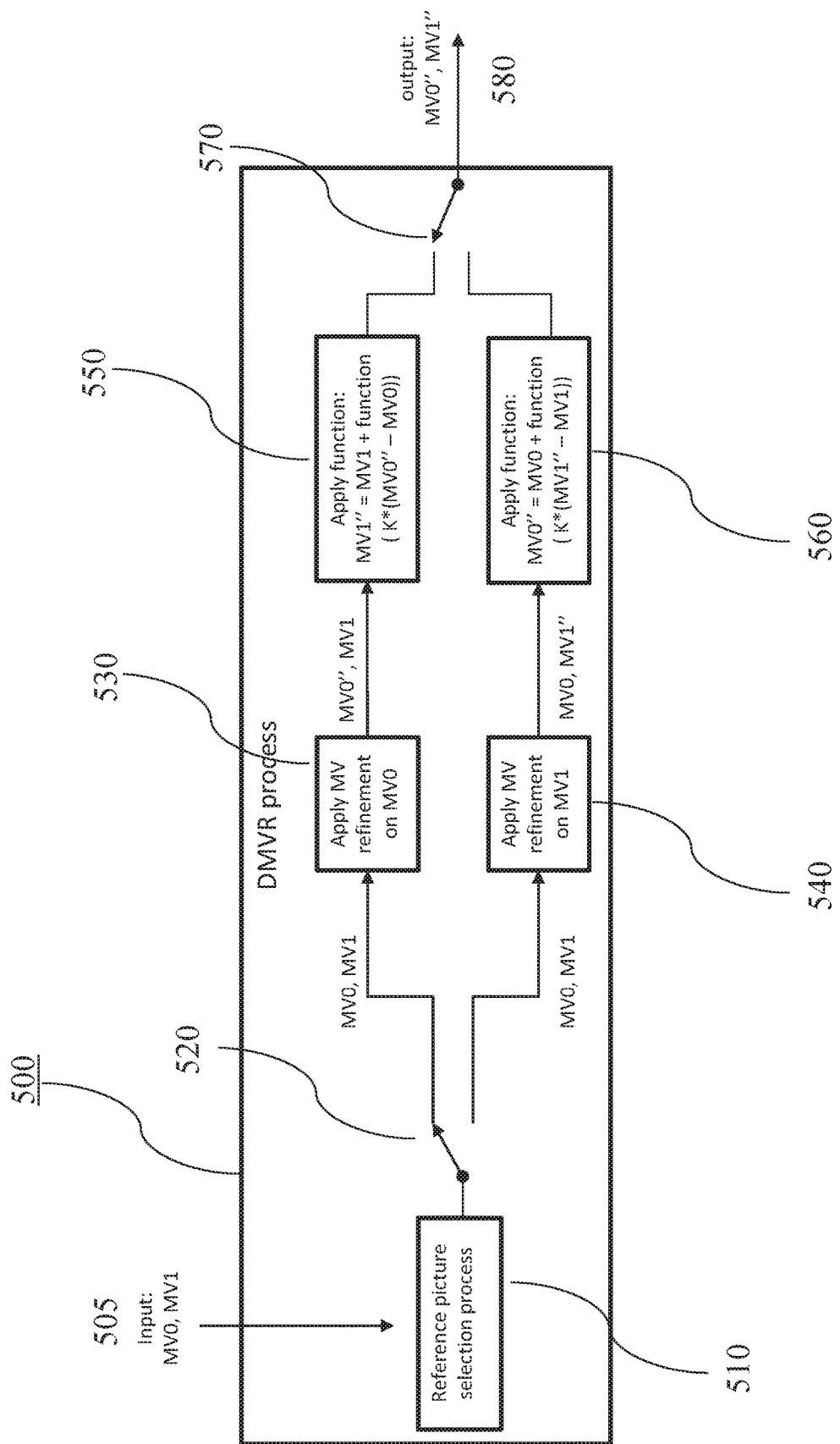
FIG. 5 is a block diagram illustrating a motion vector refinement apparatus.

In the above example a first motion vector MV0" was refined by template matching whereas a second motion vector was refined by calculation. However, according to the present disclosure, a selection process may be further performed for setting, which motion vectors are to be refined by template matching and which are to be determined by calculation. FIG. 5 shows a block diagram of an example of a motion vector refiner 500.

Figure 8:
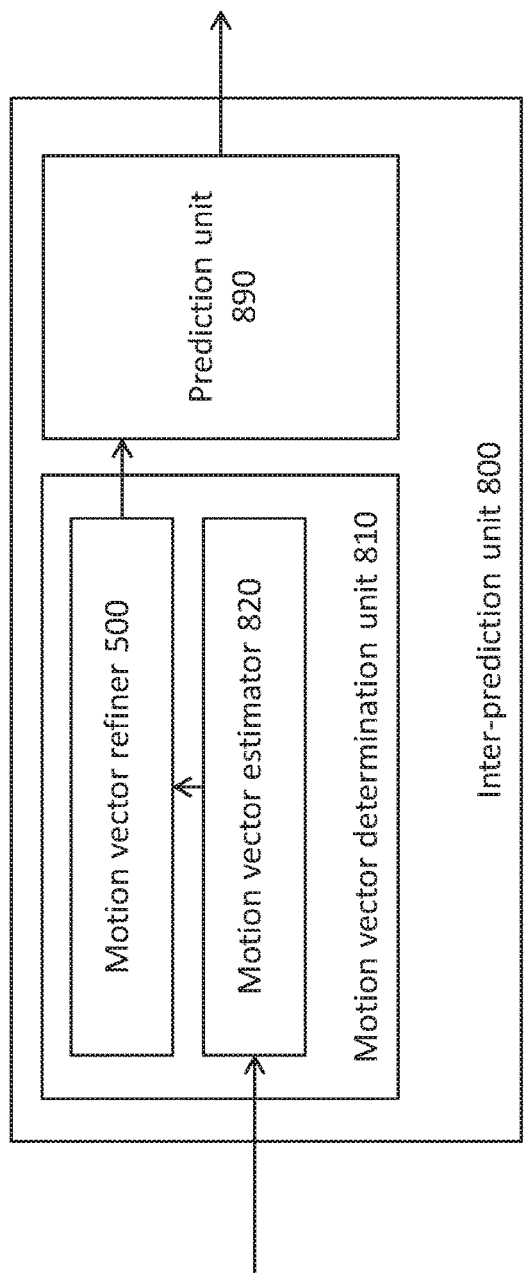
FIG. 8 is a block diagram illustrating an inter-prediction unit for determining motion vectors and performing intra-prediction according to an embodiment.

The motion vector refiner 500 may be included within an apparatus for determining motion vectors 810 as illustrated in FIG. 8. The apparatus may be included in the inter-prediction unit 800 which may replace the inter-prediction unit 110 shown in FIG. 1 and/or in the inter-prediction unit 210 shown in FIG. 2.

More specifically, an apparatus 810 for determining a first motion vector in a first reference picture and a second motion vector in a second reference picture is provided. The first and second motion vectors can be applied in inter-prediction of a picture block in a current picture.

The apparatus 810 comprises a motion vector refiner 500 which, as shown in detail in FIG. 5, further comprises a motion vector refinement unit 530 configured to obtain an estimate MV0 of a first motion vector MV0" and determine the first motion vector MV0''' by performing a search within a search space specified based on the estimate MV0. The apparatus further comprises a motion vector calculation unit 550 configured to obtain an estimate MV1 of a second motion vector MV1" and calculate the second motion vector MV1" based on the estimate MV1 of the second motion vector MV1" and based on the first motion vector MV0".

In the example, the apparatus comprises a first branch which comprises the motion vector calculation unit 530 and the motion vector calculation unit 550, and a second branch which comprises the motion vector calculation unit 540 and the motion vector calculation unit 560, and a switch 520 for enabling one of the two branches and disabling the other one. The second branch is similar to the first branch and differs from it mainly in that it outputs a first motion vector MV1" and a second motion vector MV0", by processing MV1 as an estimate of the first motion vector and MV0 as an estimate of the second motion vector.

More specifically, the motion vector refinement unit 540 is configured to obtain an estimate MV1 of a first motion vector MV1" and determine the first motion vector MV1" by performing a search within a search space specified based on the estimate MV1. The apparatus further comprises a motion vector calculation unit 560 configured to obtain an estimate MV0 of a second motion vector MV0" and calculate the second motion vector MV0" based on the estimate MV0 of the second motion vector MV0" and based on the first motion vector MV1".

FIG. 5 shows application of the invention to bi-prediction in which there are two motion vectors in two respective reference pictures determined, namely motion vectors MV0" and MV1". Accordingly, also selection of the picture for refinement by template matching is also performed simply by taking one of MV0 and MV1 for template matching and maintaining the other one MV1 or MV0 respectively for calculation.

This process of decoder motion vector refinement (DMVR) is performed by the apparatus 500. The motion vector refinement unit 530 or 540 (depending on which of the respective motion vector estimates MV0 and MV1 the template search is to be performed) receives on an input 505 the respective motion vector estimate MV0 or MV1 from the motion vector estimator 820 and sets a search region 310 around the MV0 or MV1. The size of the search region in FIGS. 3 and 4 is 3×3 integer pixels, half-pixel interpolated to 7×7, hence 49 positions in total. In general, the form and/or size of the search region may be different and the present invention works irrespectively of the size and shape of the search region. The search region may have a predetermined or a predefined size. In other words the shape and size of the search space may be fixed and specified in a standard. Alternatively, one of several possible forms and sizes may be selected manually by the user within encoder settings and/or automatically based on the content of the video.

Figure 6:
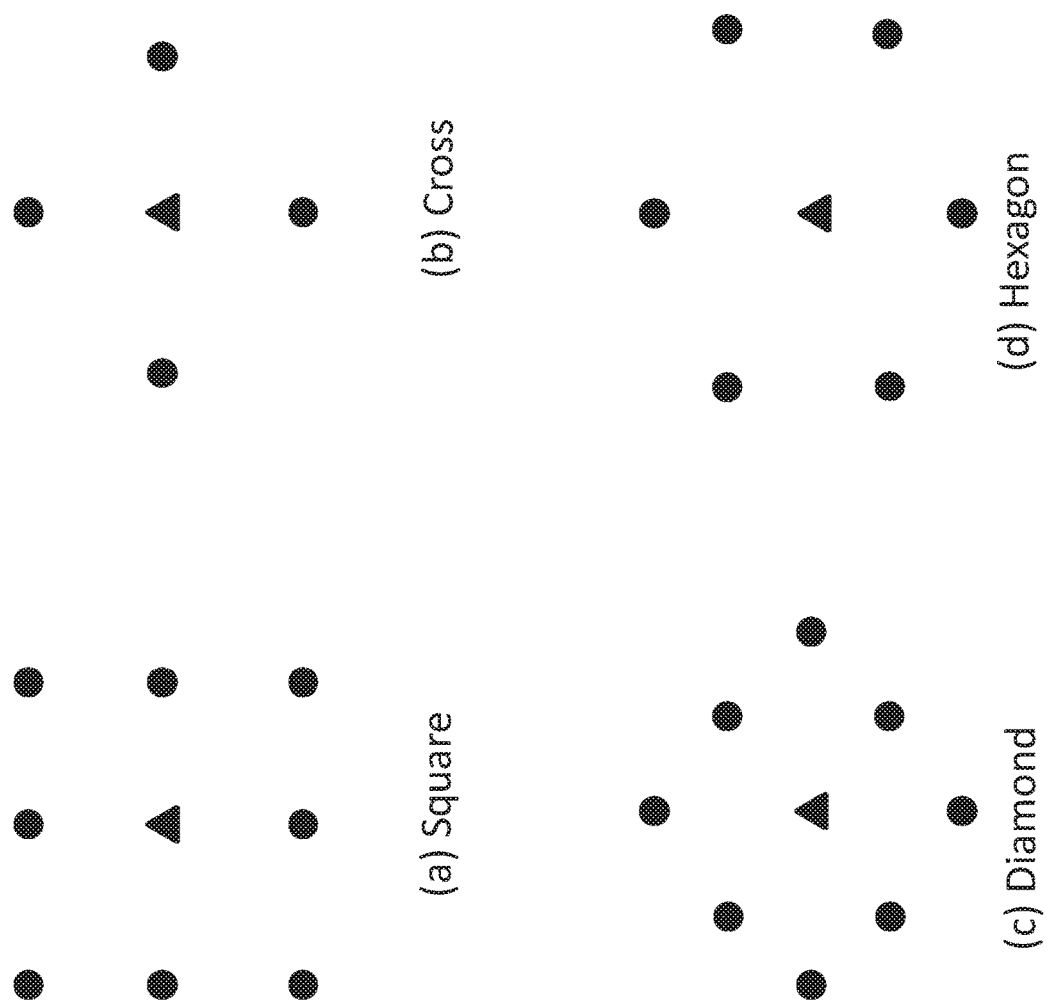
FIG. 6 is a schematic drawing illustrating various configurations of search spaces.

Some examples of sizes and shapes of a search space are shown in FIG. 6. The full triangle marks the central pixel of the search space, while the full circles mark the remaining search space positions.

It is noted that the search space may further be extended by fractional (half-pixel, quarter-pixel or the like) interpolation. The present disclosure is generally not limited to any particular pixel pattern.

For each of the positions or fractional positions within the search region, template matching using the template which approximates the current block is performed, providing a SAD value for each search space coordinate. It is noted that integer pixel resolution and half-pixel resolution herein describes the resolution of the search space, i.e. the displacement of the searched positions to the non-refined motion vector that is input to the process. As a result the search coordinates do not necessarily coincide with the actual pixel coordinates on the image plane. In other words, integer pixel (sample) resolution of the search space does not necessarily mean that the search space positions are located on integer pixels of the reference image. Integer positions of the search space may coincide with fractional pixels of the reference image, especially if the initial motion vector MV0, MV1 pointed to a fractional pixel within the reference image.

A comparison of the SAD values of the positions in the search region is performed, determining the position with the minimum SAD value. The position with the minimum SAD value is determined as the motion vector MV0". As mentioned in the background section, SAD is only an example and any other metric such as MSE, SSIM, correlation coefficient or the like may be used in general. The determined first motion vector MV0" together with an estimate of the second motion vector MV1 are passed to the motion vector calculation unit 550, where the determination (refinement) of the motion vector MV1" is performed by calculation.

As a first exemplary approach, as already described above with reference to FIG. 4, the motion vector calculation unit 550 is configured to calculate the second motion vector by adding to the estimate of the second motion vector a difference between the first motion vector and the estimate of the first motion vector or a function of the difference between the first motion vector and the estimate of the first motion vector.

Adding the difference can be calculated as follows:

$$MV1''=MV1+(MV0-MV0'') \tag{1}$$

This equation 1 (with adding negative difference MV0"-MV0) works for the case shown in FIG. 4, when the two reference pictures are located one of them before and the remaining other one of them after the current picture. As can be seen in FIG. 4, in order to extrapolate regular motion, the difference between the current motion vector and the first motion vector in a preceding picture is projected to the picture following the current picture with the reversed sign.

If both reference frames for MV0 and MV1 are located either after or before the current picture, then the difference is directly added without changing the sign resulting in:

$$MV1''=MV1+(MV0''-MV0) \tag{2}$$

The location before/after mentioned above is meant to be in displaying order. The displaying order of the pictures in a video may differ from the encoding/decoding order, i.e. from the order in which the coded pictures are embedded in the bitstream. The displaying order of the pictures may be given by Picture Order Count (POC). In particular, POC in H.265/HEVC is signaled in the slice header of each slice which is a picture or its portion.

The condition used to determine whether or not the two reference pictures are one following and one preceding the current picture may be implemented using parameter POC as follows:

$$(POCi-POC0)*(POCi-POC1)<0 \tag{3}$$

wherein POCi is a display order (sequence number) of the current picture, POC0 is a display order of the first reference picture and POC1 is a display order of the second reference picture. If the condition in equation 3 is true, than either the first reference picture is preceding and second reference picture is following the current picture or vice versa. If on the other hand the condition of equation 3 is not true, then either both reference pictures are preceding or both following the current picture. However, please note that the condition may be implemented in any way which enables to check whether or not the signs of the two difference expressions (POCi−POC0) and (POCi−POC1) are same. The above equation 3 is only an example taking multiplication "*" for its relatively simple implementation.

Adding the function of the difference can be calculated as follows in case of a bi-directional prediction in which one of the reference pictures precedes and the other one follows the current picture (condition in equation 3 being true):

$$MV1''=MV1-f(MV0''-MV0) \tag{4}$$

Again, if the two reference pictures were both preceding or both following the current picture in the display order (condition in equation 3 being false), then the calculation would add the difference without reversing the sign:

$$MV1''=MV1+f(MV0''-MV0) \tag{5}$$

For instance, the function may include scaling and/or clipping.

If the function is scaling, the calculation of the motion vector may be as follows:

$$MV1''=MV1-k*(MV0''-MV0)=MV1+k*(MV0-MV0'') \tag{6}$$

wherein "*" stands for multiplication (scaling) and k is a scaling parameter. If k=1, equation 1 is obtained. With a fixed (predefined) k, equation 6 is applicable to cases where one of reference pictures precedes and the other one follows the current picture. For the case in which both reference pictures are preceding or both are following the current picture, the sign would need reversing:

$$MV1''=MV1+k*(MV0''-MV0)=MV1-k*(MV0-MV0'') \tag{7}$$

According to an embodiment, the value of the scaling parameter depends on a ratio between the respective distances of the first picture and the second picture to the current picture. Thus, the value of k is not predefined and not fixed, but may vary depending on the reference pictures in which the motion vectors are defined. For instance, the scaling factor k may be given by:

$$k=-(POCi-POC1)/(POCi-POC0) \tag{8}$$

It is noted that the above equation 8 already takes into account the change of the sign since the scaling parameter changes sign depending on whether both reference pictures are on the same side (preceding or following) of the current picture or on different sides of the current picture in the displaying order.

Even though it may be beneficial to take into account the distance between the respective first and second reference pictures to the current picture, even if these distances are mutually different, setting k=1 as in equations 1 and 2 may still be applied. It is simpler and the quality of the refined motion vector may still be substantially higher than not applying the refinement.

After the scaling operation, rounding or clipping operations can be applied. Here, rounding refers to providing an integer or real number with a predefined accuracy closest to the input value. Clipping refers to removing digits with precision higher than a predefined accuracy from the input value. This may be particularly beneficial in view of a fixed-point arithmetic applied in typical computation systems.

As the motion vector refinement is performed only on one of the two reference pictures, the search space for performing template matching on is reduced by 50%.

After the above described processing for the current block in the current picture, two reference pictures and their associated respective motion vectors MV0" and MV1" are provided at the output 580. These motion vectors are used to determine the predictor for the current block, for instance, by averaging two respective predictors obtained by taking respective portions of the reference pictures corresponding in size and shape to the current block and pointed to by the motion vectors MV0" and MV1". This is performed by a prediction unit 890.

In general words, the prediction unit 890 determines the prediction block by combining a portion of the first reference picture referred to by the first motion vector MV0" and a portion of the second reference picture referred to by the second motion vector MV1".

The combined prediction signal can provide a better adaptation to the original signal than uni-prediction, resulting in less residual information and possibly a more efficient compression.

As explained in the previous paragraph, the output motion vectors MV0" and MV1" of the apparatus 500 may result in lower residual information. Hence, using them may improve the prediction performance compared to the initial motion vectors MV0 and MV1. It is noted that the apparatus 500 can be employed multiple times in order to improve the prediction performance further. In this case the output of the first application of apparatus 500 is considered as the input of the second application and equality between the motion vectors (equations 1 to 8) holds after each application. In this case, since the motion vectors MV0" and MV1" provide a better estimation of the current block after the first application of apparatus 500, the template that is used in the MV refiner unit 530 is constructed based on the samples pointed to by MV0" or samples pointed by MV1" in the second application.

According to an exemplary embodiment, the apparatus 500 further comprises a reference picture selection unit 510 configured to obtain two reference pictures and select which of them is to be the first reference picture and the second reference picture.

In other words, the reference picture selection unit 510 controls for a current block, which of its motion vectors is to be refined by template matching and which is to be refined by calculation on the basis of a refinement of another refined motion vector. In the following, several examples are provided on how the selection process can be performed by the reference picture selection unit 510.

Figure 7:
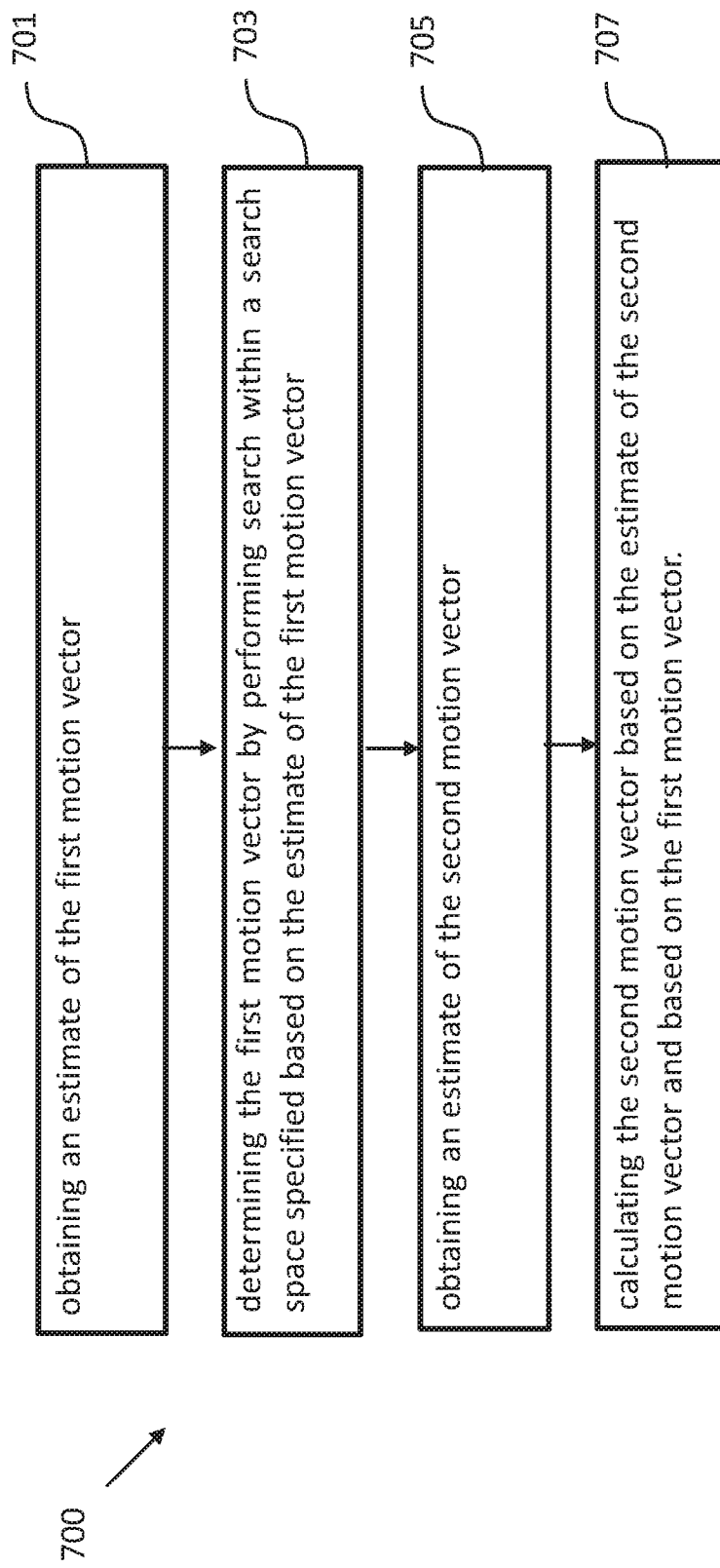
FIG. 7 is a schematic drawing illustrating a method for determining motion vectors according to an embodiment.

FIG. 7 shows a schematic diagram illustrating a method 700 for determining a first motion vector in a first reference picture and a second motion vector in a second reference picture according to an embodiment. For example, a digital video encoder 100 or decoder 200, described above, particularly the inter prediction unit 110 or 210, may use the process 700 to obtain the first and second motion vectors to be applied in inter-prediction of a picture block in a current picture. The method 700 comprises a step 701 of obtaining an estimate of the first motion vector, a step 703 of determining the first motion vector by performing a search within a search space specified based on the estimate of the first motion vector, a step 705 of obtaining an estimate of the second motion vector and a step 707 of calculating the second motion vector based on the estimate of the second motion vector and based on the first motion vector.

Example 1

In a first example, the reference picture selection unit 510 decides which of the motion vector is to be determined by search in a search space on the basis of the list from which the reference picture belonging to the respective motion vector was referred to. In particular, in order to signal predictor information which is used by the decoder to recover the same predictor as used at the encoder within the bitstream, some codecs signal reference picture by including into the bitstream an index associated in a list of reference pictures with a particular reference picture. For instance the list of reference pictures (reference picture list) may be a table available at both encoder and decoder and associating an index with a relative position of a respective reference picture with respect to a current picture.

There may be more than one list of reference pictures. For instance, reference picture list L0 and reference picture L1 as usually used in H.265/HEVC. In order to signal in the bitstream the reference picture, at first a reference picture list is signaled followed by the index within the signaled reference picture list.

The reference picture selection unit 510 is then advantageously configured to select either the first reference picture or the second reference picture based on whether or not it is referred to in the bit stream by an index in a predefined list of reference pictures. In this context the term "predefined" means fixedly defined for instance in a standard or defined for the entire video in a signaling. Exemplarily, the predefined list may be list L0. Then if the first reference picture was referred to from reference picture list L0 whereas the second list was referred to from reference picture list L1, the first motion vector pointing to the first reference picture will be refined by template matching since it was referred to from L0, whereas the second motion vector will be calculated since it was not referred to from L0. However, please note that the predefined list is not limited to the L0 list. Any of the used reference picture lists may be predefined instead. Usually, L0 would list reference pictures in a closer neighborhood than L1. Alternatively, L0 may include more reference pictures preceding the current picture in the displaying order, whereas L1 may include more pictures which follow the current picture in the displaying order. However, the present invention works irrespectively of which particular difference there is between the two or more reference picture lists.

It is noted that a situation may occur in which both the first reference picture and the second reference picture pointed to by the respective first and second motion vectors are referred to from the same reference picture list. For instance, both the first reference picture and the second reference picture may be referred to from picture the predefined list L0. Alternatively, if a current coding block applies bi-prediction, one reference picture from list L0 and one reference picture from list L1 must be indicated, where both reference pictures might be included together in one (or both) of the reference lists. The reason is a reference picture can be present in both lists (list L0 and list L1).

If the first reference picture and the second reference picture are both included in the predefined list (such as L0), the picture with the highest position in the list (L0) is selected as the reference picture used for motion vector refinement by template matching of the corresponding motion vector pointed thereto.

The same selection may be performed if both reference pictures are included in a list of reference pictures which is not predefined (such as L1, if L0 is predefined). In other words, if the reference pictures are referred from a list of reference pictures other than the predefined list of reference pictures, the reference picture with the highest position in the list is selected for template matching based motion vector refinement.

In summary, the reference picture selection unit 510 is configured to, if the two reference pictures are referred to in the bitstream by an index in the same predefined list of reference pictures, select the first reference picture as the picture with the highest position in said list of reference pictures.

This example provides for a simple implementation without any additional intelligent selection process. In particular, the reference picture selection unit 510 controls a switch 520 and 570 to select the upper or the lower branch in the block diagram of FIG. 5 when the parsed reference picture list is the predefined list (such as L0) and, if both pictures are in the same list, also based on the index value of the reference picture.

Example 2

According to a second example, the reference picture selection unit 510 is configured to select as the first reference picture (which is to be refined by template matching) a picture which has the lowest temporal layer among the two (or more) reference pictures for the current block. In other words, the reference picture selection unit 510 controls the switches 520 and 580 to select the upper branch (530, 550) or the lower branch (540, 560) according to the temporal layer of the reference pictures to which motion vectors MV0 and MV1 are related.

It is noted that in FIG. 5, the upper and lower branches do not necessarily need to be implemented in a double manner. In general, in any of the embodiments and examples of the present disclosure, a single motion vector refinement unit 530 and a single motion vector calculation unit 550 are provided and merely the input to the single branch is switched according to the control of the reference picture selecting unit 210.

In particular, the temporal layers of the two (or more) reference pictures are determined. The temporal layer of a reference picture indicates the number of pictures, which have to be decoded before the reference picture can be decoded. The temporal layer is usually set at the decoder which encodes the video motion picture in different temporal layers. It may be included into the bitstream. Thus, decoder may, based on signaling information from the bitstream, determine which reference pictures belong to which temporal layer. Accordingly, then, the first reference picture or the second reference picture with the lower temporal layer is selected as the reference picture used for motion vector refinement by template matching. This approach may provide the advantage of selecting for the template matching the reference picture which depends on less previously decoded pictures and thus, with lower probability of errors and artifacts. Accordingly, the motion vector refinement procedure is made more resilient.

Example 3

In a third example, the reference picture selection unit 510 is configured to select as the first reference picture (to be refined by template matching) the picture which has the lowest base quantization value. In other words, the reference picture selection unit 510 controls the switches 520 and 580 to select the upper branch (530, 550) or the lower branch (540, 560) according to the quantization parameter of the reference pictures to which motion vectors MV0 and MV1 are related.

Quantization value or quantization parameter in this context is information provided in the bitstream which enables to determine quantization step. In the well-known codecs such as H.264/AVC and H.265/HEVC, the quantization parameter enables to determine the value by which the coefficients to be quantized are to be divided. The larger the quantization value, the coarsest the quantization which typically leads to a worse image quality after reconstruction. Thus, a lower quantization value means that a higher quality of reconstructed image may be provided. Selection of reference picture with a lower quantization parameter means that a reference picture with a better quality is used for the motion vector refinement, which then also leads to better refinement results.

The term "base" quantization value refers to a quantization value which is common to a picture slice and used as a base for all blocks. Usually, such value is signaled for instance in the slice header. Then, typically, a difference from the base value is signaled on a block or processing unit basis.

However, the present invention is not limited to any particular signaling or even existence of such value. The same effect can be achieved by determining the base quantization value for a picture according to the quantization values of elements in the picture, for which the quantization value is signaled. In other words, the term base quantization value denotes a general quantization value for a picture.

Example 4

According to a fourth example, the reference picture selection unit 510 is configured to select as the first reference picture the picture which has the lowest distance to the current picture. In other words, the reference picture selection unit 510 controls the switches 520 and 580 to select the upper branch (530, 550) or the lower branch (540, 560) according to the distance of the reference pictures related to the respective motion vectors MV0 and MV1 to the current picture.

For instance, differences between the picture order count (POC) values POC0 and POC1 of respective reference pictures related to the respective motion vectors MV0 and MV1 and the POC value POCi of the current picture are determined. The POC value specifies the display order of the pictures rather than coding/decoding. Hence, a picture with POC=2 is displayed before a picture with POC=8. However, it is noted that as the invention is not limited to application in the well known codecs such as H.264/AVC and H.265/HEVC, the difference between the reference picture and the current picture may be determined in any other way, not depending on the particular POC parameter.

The first reference picture related to the motion vector MV0 or the second reference picture related to the motion vector MV1 that has the smaller absolute POC difference (between the reference picture and the current picture) is selected as the reference picture to be used for motion vector refinement since it is expected that the motion vectors of the closer reference pictures are more precise and/or the reference block pointed to by the motion vectors is more similar to the current block. This may lead to a better quality of the refinement.

Example 5

According to a fifth example, the reference picture selection unit is configured to select the first reference picture and the second reference picture such that the magnitude of the estimate of the first vector is smaller than the magnitude of the estimate of the second motion vector. In other words, the reference picture selection unit 510 controls the switches 520 and 580 to select the upper branch (530, 550) or the lower branch (540, 560) according to the length (magnitude) of the motion vectors MV0 and MV1 related to the respective reference pictures.

The absolute magnitudes of motion vectors MV0 and MV1 pointing to the first reference picture and the second reference picture are determined using standard procedures for the determination of an absolute value of a vector. For instance, the squared values of each vector component of a motion vector are summed up. Either this sum or its square root may be used as the magnitude of the motion vector, but the calculation of a square root has higher computational costs. Taking the motion vector with smaller magnitude for the refinement provides the advantage of a higher likelihood to be determined correctly, assuming that motion between pictures is typically small.

Some information on an estimate of the first motion vector MV0, an estimate of the second motion vector MV1 and indices of the reference pictures to which MV0 and MV1 refer to may be received at the decoder as input. The motion vector information is typically signaled on a block basis, the blocks can have different sizes. The same is true for the reference picture indication. A bitstream parser implemented as a part of the entropy decoding unit 203 obtains the motion vector information from the bitstream. The motion information may be directly the coordinates of the motion vector (coordinates with respect to the point (0, 0) given by the location of a block in the reference picture same as the location of the current block in the current picture). Alternatively, a difference to a motion vector of a block preceding current block in the decoding order may be signaled. This may advantageously be one of the spatial or temporal neighbors of the current block.

According to another example, an apparatus for motion vector determination which also includes the motion vector refiner 500, further includes a motion vector estimation unit 820 configured to determine the estimate of the first motion vector and the estimate of the second motion vector by selecting them from a set of motion vector candidates based on similarity of a template with a portion of the respective picture referred to by the motion vector candidate. In other words, the motion vector determination (of MV0 and MV1) is not necessarily based on template matching in a search space defined in the reference picture. The search space may be given by a (merge) list which lists indexes in association with the respective motion vectors of the spatially or temporally adjacent blocks or blocks in the proximity of the current block. This is to say that the present invention is not limited by the way in which the motion vector estimates MV0 and MV1 are derived before they are provided for refinement.

In summary, the bi-prediction operation of one coding block, the two prediction blocks, from the motion vectors (MV) of list L0 and MV of list L1 respectively, are combined to a single prediction signal, which can provide a better adaptation to the original signal than uni-prediction, resulting in less residual information and possibly a more efficient compression. The bi-prediction decoding processing for the current block in the current picture contains the following processing steps.

First, an estimate of the first motion vector MV0 and an estimate of the second motion vector MV1 are received as input at the decoder side. Two reference pictures, to which MV0 and MV1 point, are in the picture buffer of the decoder as they have been already decoded before processing of the current picture. One of these reference pictures is selected for motion vector refinement by template matching, for illustration the reference picture to which MV0 points. For performing motion vector refinement, a search region in the reference picture to which MV0 points is defined around the candidate point to which the selected MV0 points. The candidate search space positions within the search region are analyzed by performing template matching with the current block space and determining a similarity measure. The candidate search space position with the lowest dissimilarity value is determined as the motion vector MV0". The motion vector MV1" is calculated based on MV1 and a function of MV0"-MV0 instead of performing a second template matching.

According to an embodiment of the invention, the similarity comparison is performed by comparing the samples pointed to by MV0" and the samples pointed to by MV1". According to FIG. 4, any point pointed to by MV0" in the search space 310 has a counterpart motion vector MV1" given by one or more of the equations 1 to 8. In order to compare similarity between sample blocks in the template matching process the sample block pointed by MV0" and sample block pointed by MV1" can be used in a function such as a SAD function. In this case the template consists only of samples that belong to the reference picture referred by MV1, and motion vector refinement operation is performed on MV0. Moreover the template is slightly changed for each point in the search space 310.

More specifically according to the embodiment the following steps are applied:

Step 1: The similarity between the samples pointed to by input motion vector MV0 and the samples pointed to by input motion vector MV1 is computed. The input motion vector MV0 points to the point 330 in the search space.

Step 2: A second point in the search space 310 is selected, which is different from the point 330. The second point is denoted by MV0".

Step 3: The motion vector MV1" is computed using one or more of the equations 1 to 8, based on MV0", MV0 and MV1.

Step 4: The similarity between the samples pointed to by input motion vector MV0" and the samples pointed to by input motion vector MV1" is computed. If the similarity is higher than the computed value in Step 1, the MV0" and MV1" pair is selected as the refined motion vectors. Otherwise the MV0 and MV1 pair (i.e. the initial motion vector pair) is selected as refined motion vectors.

Steps 2, 3 and 4 can be repeated to evaluate more candidate points in the search space 310. If no search points are left in the search space, then the refined motion vectors are output as the final refined motion vectors.

In step 4, it is clear that if the similarity metric (such as SAD, SSIM, etc.) might result in the highest similarity at the initial point 330 that is pointed by initial motion vector MV0 whose counterpart is initial motion vector MV1 according to one or more of the equations 1 to 8. If this is the case the refined motion vectors hence the output of the motion vector refinement process is considered to be MV0 and MV1.

Any motion vector pair MV0" and MV1" which is the output of the apparatus 500 must obey the rules described in one or more of the equations 1-8. The specific details of the construction of the template and the similarity metric that is used in the template matching operation might change without affecting the invention and its benefit, which is the reduction of search points to be checked by pairing of two motion vectors.

According to an embodiment of the present invention, apart from the bi-prediction processing performed in the inter-prediction unit as described above, the other processing steps for encoding and decoding follow the standard H.265/HEVC.

However, in general, the present invention is applicable to any video decoder for decoding a plurality of pictures from a bitstream. Such decoder may then comprise an inter-prediction unit including the apparatus according to any of claims 1 to 11 and a prediction unit for determining a prediction block according to a portion of the first reference picture referred to by first motion vector and a portion of the second reference picture referred to by the second motion vector. The decoder may further comprise a bitstream parser. The bitstream parser may be implemented, for example, as a part of the entropy decoding unit 203 and configured to obtain from the bitstream the estimate of the first motion vector and the estimate of the second motion vector. The video decoder may further comprise a reconstruction unit 211 configured to reconstruct the current block according to the prediction block.

On the other hand, a video encoder for encoding a plurality of pictures into a bitstream may comprise an inter-prediction unit including the apparatus according to any of claims 1 to 12 and a prediction unit for determining prediction block according to a portion of the first reference picture referred to by first motion vector and a portion of the second reference picture referred to by the second motion vector, a bitstream former which is implemented as a part of the entropy encoding unit 103 and configured to include into the bitstream the estimation of the first motion vector and the estimation of the second motion vector, and a reconstruction unit 111 configured to reconstruct the current block according to the prediction block and storing the reconstructed block in a memory.

The inter-prediction decoding processing described above is not limited to the use of two reference pictures. Alternatively, more than two reference pictures and the associated motion vectors may be considered. In this case, reference picture selection unit selects more than two reference pictures out of which one reference picture is used for motion vector refinement. The selection of the reference picture which is used for motion vector refinement is using one of the approaches described in examples 1 to 5 discussed above. The remaining motion vectors are adjusted using the estimate of the respective motion vector and the motion vector resulting from motion vector refinement. In other words, the present invention as described above may also work, if a multi-reference prediction is performed. For instance, if there are three reference pictures and three respective motion vectors, one of the three motion vectors may be determined by refinement by template matching and two others calculated. This provides complexity reduction. Alternatively, two of the motion vectors are determined by refinement by template matching and one is calculated based on one or both of the refined motion vectors. As is clear to those skilled in the art, the present invention is extendable to any number of reference pictures and the corresponding motion vectors used to construct predictor for the current block.

The invention has the effect to make it possible to perform bi-prediction at a decoder with reduced processing load and memory requirements. It can be applied at any decoder, may it be included in a coding device and/or in a decoding device, i.e. at the encoder sider or the decoder side.

The motion vector refinement as described above can be implemented as a part of encoding and/or decoding of a video signal (motion picture). However, the motion vector refinement may also be used for other purposes in image processing such as movement detection, movement analysis, or the like.

The motion vector refinement may be implemented as an apparatus. Such apparatus may be a combination of software and hardware. For example, the motion vector refinement may be performed by a chip such as a general purpose processor, or a digital signal processor (DSP), or a field programmable gate array (FPGA), or the like. However, the present invention is not limited to implementation on a programmable hardware. It may be implemented on an application-specific integrated circuit (ASIC) or by a combination of the above mentioned hardware components.

The motion vector refinement may also be implemented by program instructions stored on a computer readable medium. The program, when executed, causes the computer to perform the steps of obtaining estimates of the motion vectors, determining the first reference picture and the second reference picture based on the estimates, performing motion vector refinement of the first motion vector, calculating the second motion vector based on the estimates of the motion vectors and the first motion vector after refinement. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like. It may be a software, app implementing the method steps.

The invention claimed is:

1. An apparatus for performing inter-prediction for a picture block using a first motion vector associated with a first reference picture of a video and a second motion vector associated with a second reference picture of the video, the apparatus comprising:
a processor; and
at least one memory comprising a non-transitory computer-readable medium including computer-executable instructions that, when executed by the processor, cause the apparatus to carry out a method comprising:
obtaining an estimate of the first motion vector;
determining, by performing a search within a search space specified based on the estimate of the first motion vector, the first motion vector;
obtaining an estimate of the second motion vector;
calculating, after determining the first motion vector by performing the search within the search space, the second motion vector based on:
the estimate of the second motion vector, and
a difference between the first motion vector and the estimate of the first motion vector; and
applying the first motion vector and the second motion vector in association with an inter-prediction operation performed on the picture block.

2. The apparatus according to claim 1, wherein the calculating the second motion vector comprises:
adding to the estimate of the second motion vector:
the difference between the first motion vector and the estimate of the first motion vector, or
a function of the difference between the first motion vector and the estimate of the first motion vector.

3. The apparatus according to claim 2, wherein the function includes scaling by a scaling factor and/or clipping.

4. The apparatus according to claim 3, wherein the value of the scaling factor depends on a ratio between the respective distances of the first reference picture and the second reference picture to the current picture.

5. The apparatus according to claim 1, wherein the method further comprises:
 obtaining two reference pictures;
 selecting the first reference picture from among the two reference pictures; and
 selecting the second reference picture from among the two reference pictures.

6. The apparatus according to claim 5, wherein the method comprises:
 selecting the first picture or the second picture in accordance with the respective first picture or second picture being referred to, in a bit stream that also includes the coded picture block of the video, by an index relating to a predefined list of reference pictures among at least two lists of reference pictures,
 wherein a list of reference pictures associates an index with the position of a reference picture with respect to the current picture.

7. The apparatus according to claim 6, wherein the method comprises:
 selecting as the first reference picture, in accordance with the two reference pictures being referred to in the bitstream by an index in the same predefined list of reference pictures, the picture with the highest position in said list of reference pictures.

8. The apparatus according to claim 5, wherein the method comprises:
 selecting, as the first reference picture, the picture that has a lowest temporal layer among the two pictures,
 wherein a temporal layer of a reference picture indicates a number of pictures that must be decoded to decode the reference picture.

9. The apparatus according to claim 5, wherein the method comprises:
 selecting, as the first reference picture, the picture that has a lowest base quantization value,
 wherein a base quantization value refers to a quantization value that is common to a picture slice and used for all blocks.

10. The apparatus according to claim 5, wherein the method comprises:
 selecting, as the first reference picture, the picture that has a lowest distance to the current picture.

11. The apparatus according to claim 5, wherein the method comprises:
 selecting the first reference picture and the second reference picture such that the estimate of the first motion vector is smaller in magnitude than the estimate of the second motion vector.

12. The apparatus according to claim 1, wherein the method further comprises:
 determining the estimate of the first motion vector and the estimate of the second motion vector by selecting the estimate of the first motion vector and the estimate of the second motion vector from a set of motion vector candidates based on similarity of a template with a portion of the picture referred to by the respective motion vector candidate.

13. The apparatus of claim 1, configured to carry out functionality of a video decoder that decodes a plurality of pictures from a bitstream, the apparatus further comprising computer-executable instructions that, when executed by the processor, cause the apparatus to further perform:
 determining a prediction block according to a portion of the first reference picture referred to by the first motion vector and a portion of the second reference picture referred to by the second motion vector;
 obtaining, from the bitstream, the estimation of the first motion vector and the estimate of the second motion vector; and
 reconstructing the current block according to the prediction block.

14. The apparatus of claim 1, configured to carry out functionality of a video encoder that encodes a plurality of pictures into a bitstream, the apparatus further comprising computer-executable instructions that, when executed by the processor, cause the apparatus to further perform:
 determining a prediction block according to a portion of the first reference picture referred to by the first motion vector and a portion of the second reference picture referred to by the second motion vector;
 including into the bitstream the estimate of the first motion vector and the estimate of the second motion vector;
 reconstructing the current block according to the prediction block; and
 storing the reconstructed block in a-the at least one memory.

15. The apparatus of claim 1, wherein the recited operations are carried out by a video encoder.

16. The apparatus of claim 1, wherein the recited operations are carried out by a video decoder.

17. The apparatus of claim 1, wherein during the determining the first motion vector, the search within the search space is performed using template matching.

18. A method for performing inter-prediction for a picture block using a first motion vector associated with a first reference picture of a video and a second motion vector associated with a second reference picture of the video, the method comprising:
 obtaining an estimate of the first motion vector;
 determining, by performing a search within a search space specified based on the estimate of the first motion vector, the first motion vector;
 obtaining an estimate of the second motion vector;
 calculating, after determining the first motion vector by performing the search within the search space, the second motion vector based on:
 the estimate of the second motion vector, and
 a difference between the first motion vector and the estimate of the first motion vector; and
 applying the first motion vector and the second motion vector in association with an inter-prediction operation performed on the picture block.

19. The method of claim 15, wherein the recited operations are carried out by a video encoder coder.

20. The method of claim 15, wherein the recited operations are carried out by a video decoder.

21. The method of claim 18, wherein during the determining the first motion vector, the search within the search space is performed using template matching.

22. A non-transitory computer-readable medium carrying executable instructions that, when executed by a processor in an apparatus, cause the apparatus to perform a method for performing inter-prediction for a picture block using a first motion vector associated with a first reference picture of a video and a second motion vector associated with a second reference picture of the video, the first and second motion vectors applied in inter-prediction of a picture block in a current picture of the video, the method comprising:
   obtaining an estimate of the first motion vector;
   determining, by performing a search within a search space specified based on the estimate of the first motion vector, the first motion vector;
   obtaining an estimate of the second motion vector;
   calculating, after determining the first motion vector by performing the search within the search space, the second motion vector based on:
     the estimate of the second motion vector, and
     a difference between the first motion vector and the estimate of the first motion vector; and
   applying the first motion vector and the second motion vector in association with an inter-prediction operation performed on the picture block.

23. The non-transitory computer-readable medium of claim 16, wherein during the determining the first motion vector, the search within the search space is performed using template matching.

* * * * *